United States Patent [19]

Wilkus

[11] Patent Number: 5,604,923

[45] Date of Patent: Feb. 18, 1997

[54] ELECTRONIC DISPLAY SYSTEM CAPABLE OF DISPLAYING COMMUNICATION SIGNAL STRENGTH ON INDIVIDUAL ELECTRONIC DISPLAY MODULES AND METHOD OF USING THE SAME

[75] Inventor: Stephen A. Wilkus, Lincroft, N.J.

[73] Assignee: AT&T Global Information Solutions Company, Dayton, Ohio

[21] Appl. No.: 339,624

[22] Filed: Nov. 15, 1994

[51] Int. Cl.$^6$ .................................................. H04B 17/00
[52] U.S. Cl. ........................ 455/67.7; 455/66; 455/226.4
[58] Field of Search ................................ 455/54.1, 54.2, 455/66, 67.1, 67.7, 226.2, 226.4, 57.1; 364/403; 340/825.17

[56] References Cited

U.S. PATENT DOCUMENTS

| | | |
|---|---|---|
| 4,075,632 | 2/1978 | Baldwin et al. |
| 4,821,291 | 4/1989 | Stevens et al. ........................ 455/57.1 X |
| 5,019,811 | 5/1991 | Olsson et al. ........................ 340/825.17 |
| 5,198,805 | 3/1993 | Whiteside et al. ........................ 455/67.1 |
| 5,348,485 | 9/1994 | Briechle et al. ........................ 364/403 X |

FOREIGN PATENT DOCUMENTS

| | | |
|---|---|---|
| 0474489 | 3/1992 | European Pat. Off. . |
| 3536505 | 4/1987 | Germany ........................ 455/67.1 |
| 94-11832 | 5/1994 | WIPO . |
| 94-11835 | 5/1994 | WIPO . |

Primary Examiner—Chi H. Pham
Attorney, Agent, or Firm—Craig E. Miller

[57] ABSTRACT

Electronic display system capable of displaying communication signal strength on individual electronic display modules and method of using the same. In one preferred embodiment of the present invention, a pseudo-price change command is transmitted by a base communication station to an individual electronic display module and the strength of the acknowledgment signal returned by the individual electronic display module is observed and temporarily recorded. The base communication station then transmits a command to change the electronic display on that particular electronic display module to display the value of the received communication signal strength.

12 Claims, 3 Drawing Sheets

ELECTRONIC DISPLAY SYSTEM CAPABLE OF DISPLAYING COMMUNICATION SIGNAL STRENGTH ON INDIVIDUAL ELECTRONIC DISPLAY MODULES AND METHOD OF USING THE SAME

BACKGROUND AND SUMMARY OF THE INVENTION

The present invention relates generally to new and novel improvements in electronic display systems. More particularly, the present invention relates to electronic display systems which are capable of displaying communication signal strength values on individual electronic display modules to assist in calibration and diagnostic activities in setting up and optimizing the operation of such electronic display systems.

Large retail stores often deal with several tens of thousands of different kinds of goods. In such stores, much attention is paid to the management and control of the inventory of goods and the displaying and labeling of the prices of the goods being sold. Accordingly, much effort is expended and careful attention is paid to managing and controlling the stock of goods and to labeling prices of products displayed on shelves or in showcases. Mistakes as to the labeling of the prices of goods could cause dissatisfaction to customers and damage the reputation of the store.

Therefore, it is desirable to correctly identify the prices of goods and minimize the number of pricing errors. Accordingly, electronic shelf display systems having multiple electronic display modules have been developed. Such electronic display systems are typically arranged such that light weight compact electronic display modules which display the product's price, along with other product information, are placed on display shelves or showcases in front of the displayed products. These types of electronic display systems typically allow the prices of products displayed in the electronic display portions of the electronic display modules to be changed when the prices are raised or lowered and/or when the arrangement of goods displayed on the display shelves or showcases are changed. It is advantageous in such electronic display systems to have electronic display modules which are capable of providing acknowledgment of the receipt of transmitted price changes, bedchecks, as well as other transmitted information, to help identify "lost" or broken electronic display modules.

In such electronic display systems, it becomes possible to reliably identify the correct prices of goods since changes in the prices of goods displayed on the electronic display portions of the electronic display modules are controlled and managed by a communications base system or some other processing control unit. If desired, other product information, for example, inventory or stocking information, product identification numbers or codes, and product volume or weight, could be displayed on the electronic display portions of the electronic display modules. In addition, electronic display systems in accordance with the present invention could be used in applications other than retail store environments, for example, in identifying inventory information in warehouses or distribution centers.

When setting up electronic display systems which utilize wireless communication to and from a communications base station, it is normally desirable to maximize the communication signal strength received from the electronic display modules. A communication signal strength below a certain threshold value may result in the message not being received from the appropriate electronic display module. The communication signal strength received from electronic display modules is dependent on several factors, including the number and position of transmitting antenna stations, the configuration and set-up of the building and its contents, the number and placement of fluorescent lighting fixtures and refrigeration units and many others. Because so many factors influence the strength of the communication signal received from individual electronic display modules, it is often desirable to optimize the communication signal strength received from individual electronic display modules by "trial and error" or by observing the communication signal strength received from an electronic display module under certain operating conditions, changing the operating conditions in some controlled manner, and observing the effect on the communication signal strength received from the electronic display module.

In the past, a relatively sophisticated and expensive piece of equipment, for example a signal spectrum analyzer, was typically used to measure the communication signal strength at individual electronic display modules. Using such a separate piece of test equipment is disadvantageous in not only the cost, but also in that a separate piece of test equipment must be carried to and from each individual electronic display module. In addition, a source of electrical power, such as a battery or electrical cord and outlet, is generally required to provide electricity for operation of such a separate piece of test equipment. Furthermore, using such a separate piece of test equipment may be cumbersome in certain locations, such as in freezers or other compact areas.

Moreover, a signal spectrum analyzer or power meter can only measure the radio frequency signal strength at the electronic display module's location. The acknowledgment signal strength results from the two paths from the base communications station down to the individual electronic display module and a reflection of the signal from the electronic display module back up to the base communications station. The loss experienced during this two-way radio frequency signal path can be readily and accurately measured in accordance with the teachings of the present invention. Namely, by using the actual installed base communications station, including its own antennas, and actual electronic display modules, the loss experienced during two-way radio frequency signal transmission is measured and displayed on the electronic displays of the particular electronic display modules of interest.

Accordingly, an object of the present invention is to provide an electronic display system which is capable of measuring the communication signal strength received from individual electronic display modules.

Another object of the present invention is the provision of an electronic display system having electronic display modules which are capable of displaying a value representing the communication signal strength received from the individual electronic display modules.

These and other objects of the present invention are attained by the provision of an electronic display system having electronic display modules which are capable of displaying a value representing the communication signal strength received from the individual electronic display modules. In one preferred embodiment of the present invention, a pseudo-price change command is transmitted by a base communication station to an individual electronic display module and the strength of the acknowledgment signal received by the base communication station is temporarily stored. The base communication station then transmits a command to change the electronic display on that particular electronic display module to display the value of the received communication signal strength.

Other objects, advantages and novel features of the present invention will become apparent in the following detailed description of the invention when considered in conjunction with the accompanying drawings.

DETAILED DESCRIPTION OF THE DRAWINGS

Figure 1:
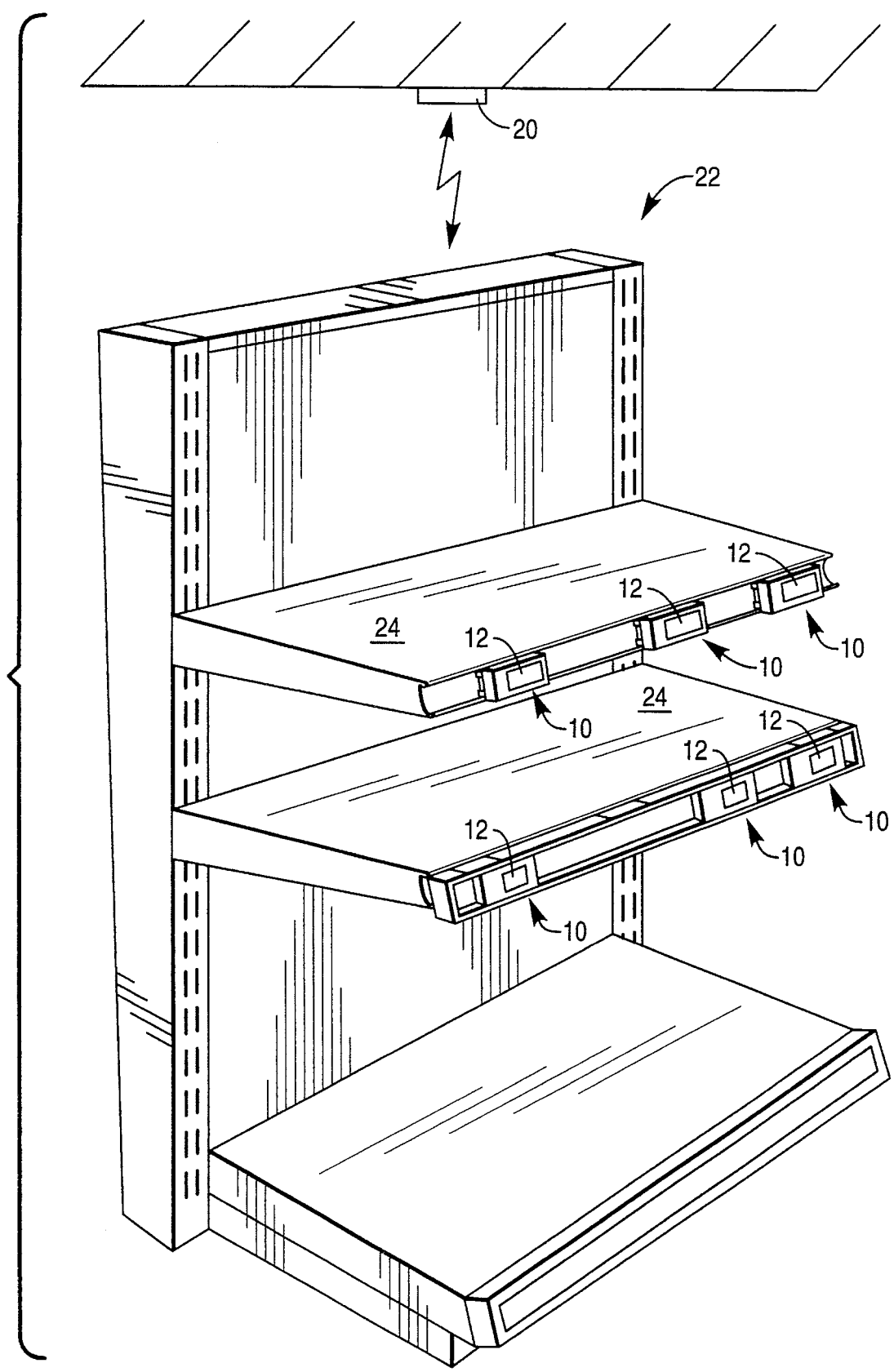
FIG. 1 is a perspective view of a typical electronic display system, including a ceiling mounted transmitting/receiving antenna and a typical display showcase having multiple shelves and a plurality of shelf mounted electronic display modules capable of displaying a value representing the communication signal strength in accordance with the present invention mounted thereon.
Figure 2:
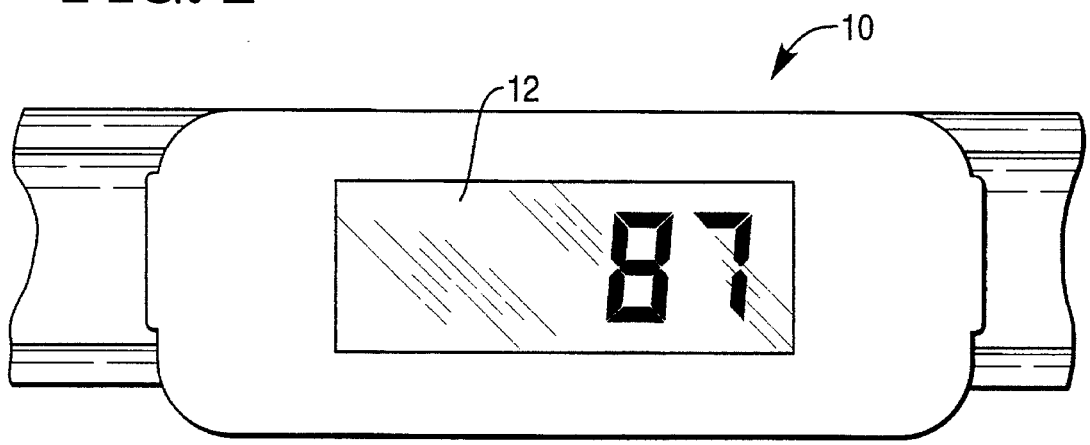
FIG. 2 is a front view of the preferred embodiment of a electronic display module for displaying communication signal strength in accordance with the present invention as shown in FIG. 1 displaying a representative measured communication signal strength value.

Referring now to the drawings, in which like-referenced characters indicate corresponding elements throughout the several views, attention is first directed to FIGS. 1 and 2 which illustrate a preferred embodiment of electronic display modules capable of displaying measured communication signal strength values in accordance with present invention, generally identified by reference numeral 10. Electronic display modules 10 preferably include electronic display 12, preferably a liquid crystal display (LCD).

Figure 3:
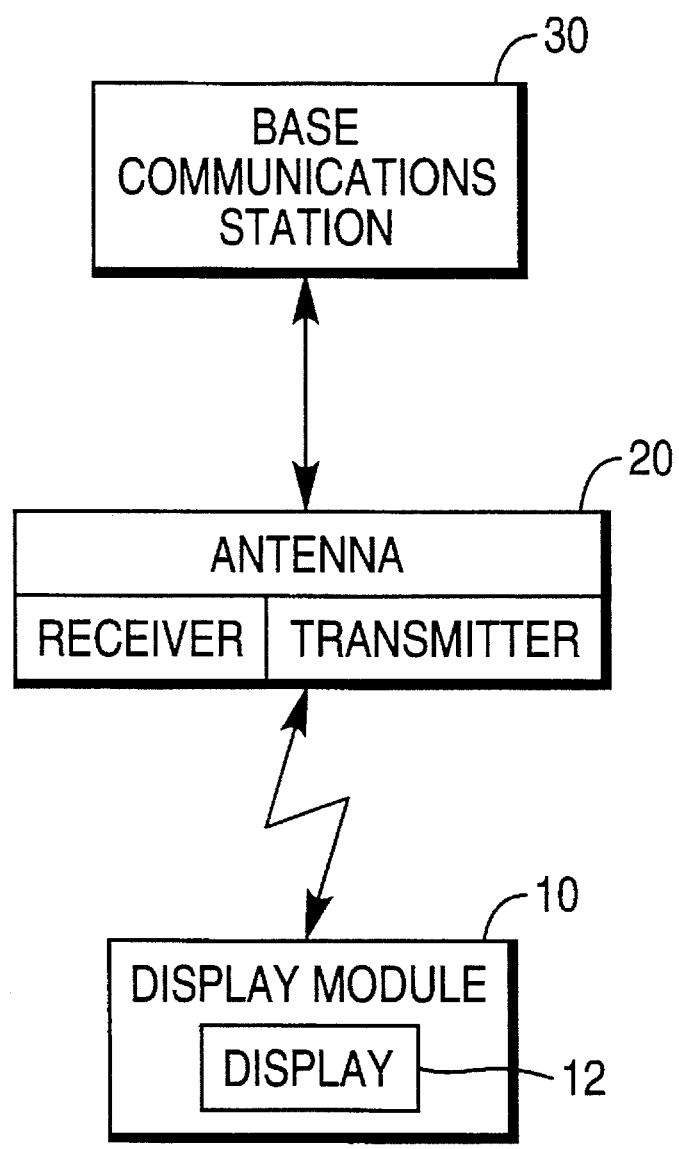
FIG. 3 is a block diagram of a typical electronic display system in which an electronic display module displays a value representing the communication signal strength in accordance with the present invention.

As seen in FIG. 1 and in block diagram form in FIG. 3, electronic display systems often include a ceiling mounted antenna 20, which transmits signals to and receives signals from one or more electronic display modules 10. Ceiling mounted antenna 20 receives signals from and forwards signals received to a base communications station 30 (shown in FIG. 3) for processing. Electronic display modules 10 are often used in retail stores and similar environments and can be mounted on display showcases or on similar merchandise displaying articles. A typical display showcase 22 having a plurality of shelves 24, each shelf 24 having multiple electronic display modules 10 mounted thereon is shown in FIG. 1.

In a preferred electronic display system in accordance with the present invention, a pseudo-price change command is transmitted from ceiling mounted antenna 20 addressed to a particular electronic display module 10. After receiving the pseudo-price change command signal, the particular electronic display module 10 returns an acknowledgment signal to ceiling mounted antenna 20. The base communications station (not shown) observes the strength of the acknowledgment signal received from the particular electronic display module 10 and transmits a command to change the "price" displayed on electronic display module 10 to the value of the received communication signal strength. As seen in FIG. 2, a communication signal strength of "87" is shown displayed on electronic display 12.

The cycle of the base communications station (not shown) receiving the acknowledgment signal from electronic display module 10, observing its strength and returning a command to electronic display module 10 to display the communication signal strength can be repeated for as long as desired. This permits certain operating conditions to be changed to evaluate the impact of such changes on the strength of the communication signal received by particular electronic display modules 10. In one preferred embodiment, this cycle is repeated every six (6) seconds so the communication signal strength being displayed on electronic display module 10 represents the communication signal sent and received approximately six (6) seconds ago. While such a six (6) second cycle has been found to be adequate in providing timely feedback as to the communication signal strength being received by particular electronic display modules 10, the length of this cycle could be modified as desired.

By permitting individual electronic display modules 10 to display the communication signal strength value received from base communications station (not shown), it is possible for field service personnel to evaluate the electronic display system without a separate piece of test equipment. In addition, store personnel can readily perform communication signal strength evaluation of individual electronic display modules 10.

In a slightly different form, the electronic display system having electronic display modules 10 capable of displaying communication signal strength values on individual electronic display modules 10 in accordance with the present invention can be useful in electronic display system diagnostics. Once installed in a fully populated environment, such as a retail store, the base communications system (not shown) could sequentially check each individual electronic display module 10, for example at night or before a store's grand opening, and transmit a communication signal strength message to evaluate if there are some "dead spots" in the store, or if any electronic display modules 10 are receiving a communications signal having inadequate strength for effective communication. This would permit a field engineer, or some other individual, to verify communication signal strength, and take appropriate corrective measures, right at the locations where electronic display modules 10 are mounted. Electronic display modules 10 can also be moved around the store to act as portable, lightweight battery powered acknowledgment signal strength meters. As an alternative, a printout or report could be prepared which indicates the communication signal strength values observed from each individual electronic display module 10 if desired. Such information can assist in determining the most effective placement of antennas, electronic display modules, display showcases, as well as other items within a store.

Although the present invention has been described above in detail, such explanation is by way of example only, and is not to be taken as a limitation on the present invention. For example, electronic display systems in accordance with the present invention could be used in various environments other than retail stores, for example in warehouses and distribution centers. Accordingly, the scope and content of the present invention are to be limited and defined only by the terms of the appended claims.

What is claimed is:

1. An electronic display system, comprising:
   at least one electronic display module having an electronic display;
   an antenna having a receiver portion to receive communication signals from said at least one electronic display module and a transmitter portion to transmit communication signals to said at least one electronic display module; and a base communications station to send communication signals to said antenna for transmittal to said at least one electronic display module, to receive a return acknowledgment signal from said at least one electronic display module and to send back a communication signal having a value of the communication signal strength of said return acknowledgment signal received from said at least one electronic display module for display on said electronic display of said at least one electronic display module.

2. The electronic display system in accordance with claim 1, wherein said electronic display is a liquid crystal display (LCD).

3. The electronic display system in accordance with claim 2, wherein said antenna is mounted on a ceiling above said at least one electronic display module.

4. The electronic display system in accordance with claim 3, wherein said at least one electronic display module is mounted on a merchandise display showcase.

5. A method of measuring the communication signal strength of an individual electronic display module in an electronic display system, comprising the steps of:

sending a pseudo-price communication signal from a base communications station;

said individual electronic display module receiving said pseudo-price communication signal from said base communications station and returning a communication acknowledgment signal;

said base communications station receiving said communication acknowledgment signal from said individual electronic display module and measuring the communication signal strength thereof;

said base communications station transmitting a value corresponding to said communication signal strength;

said individual electronic display module receiving said value corresponding to said communication signal strength from said base communications station; and said individual electronic display module displaying said value corresponding to said communication signal strength.

6. The method of measuring the communication signal strength of an individual electronic display module in an electronic display system in accordance with claim 5, wherein the steps of the method are repeated at approximately six (6) second intervals.

7. A method of measuring the communication signal strength of an individual electronic display module in an electronic display system, comprising the steps of:

sending a pseudo-price communication signal from a base communications station to a transmitting portion of an antenna;

said transmitting portion of said antenna transmitting said pseudo-price communication signal;

said individual electronic display module receiving said pseudo-price communication signal transmitted by said antenna and returning a communication acknowledgment signal;

a receiving portion of said antenna receiving said communication acknowledgment signal;

said antenna sending said communication acknowledgment signal to said base communications station;

said base communications station receiving said communication acknowledgment signal from said antenna and measuring the communication signal strength thereof;

said base communications station transmitting a value corresponding to said communication signal strength to said antenna;

said transmitting portion of said antenna transmitting said value corresponding to said communication signal strength;

said individual electronic display module receiving said value corresponding to said communication signal strength from said transmitting portion of said antenna; and said individual electronic display module displaying said value corresponding to said communication signal strength.

8. The method of measuring the communication signal strength of an individual electronic display module in an electronic display system in accordance with claim 7, wherein the steps of the method are repeated at approximately six (6) second intervals.

9. A method of measuring the communication signal strength of a plurality of electronic display modules in an electronic display system, comprising the steps of:

sending a pseudo-price communication signal from a base communications station;

each of said plurality of electronic display modules receiving said pseudo-price communication signal from said base communications station and returning a communication signal acknowledgment message;

said base communications station receiving said acknowledgment signal from each of said plurality of electronic display modules and measuring the communication signal strength thereof;

said base communications station transmitting a value corresponding to said communication signal strength;

each of said plurality of individual electronic display modules receiving said value of said communication signal strength from said communications station; and each of said plurality of individual electronic display modules displaying said value corresponding to said communication signal strength.

10. The method of measuring the communication signal strength of a plurality of electronic display modules in an electronic display system in accordance with claim 9, wherein the steps of the method are repeated at approximately six (6) second intervals.

11. The method of measuring the communication signal strength of a plurality of electronic display modules in an electronic display system in accordance with claim 10, wherein each of said plurality of electronic display modules simultaneously display said value corresponding to said communication signal strength.

12. The method of measuring the communication signal strength of a plurality of electronic display modules in an electronic display system in accordance with claim 9, wherein each of said plurality of electronic display modules simultaneously display said value corresponding to said communication signal strength.

* * * * *